(12) United States Patent
Thomas et al.

(10) Patent No.: US 11,851,376 B2
(45) Date of Patent: Dec. 26, 2023

(54) AQUEOUS GELCASTING METHOD FOR CERAMIC PRODUCTS

(71) Applicant: Delta Faucet Company, Indianapolis, IN (US)

(72) Inventors: Kurt J. Thomas, Indianapolis, IN (US); Paul A. V. Bridgett, Carmel, IN (US); Michael J. Veros, Carmel, IN (US); Joseph A. Elmer, Zionsville, IN (US); Nathanael Dennis, Greensburg, IN (US)

(73) Assignee: Delta Faucet Company, Indianapolis, IN (US)

( * ) Notice: Subject to any disclaimer, the term of this patent is extended or adjusted under 35 U.S.C. 154(b) by 666 days.

(21) Appl. No.: 16/651,285

(22) PCT Filed: Sep. 25, 2018

(86) PCT No.: PCT/US2018/052630
§ 371 (c)(1),
(2) Date: Mar. 26, 2020

(87) PCT Pub. No.: WO2019/067439
PCT Pub. Date: Apr. 4, 2019

(65) Prior Publication Data
US 2020/0391407 A1    Dec. 17, 2020

Related U.S. Application Data

(60) Provisional application No. 62/563,345, filed on Sep. 26, 2017, provisional application No. 62/563,350, filed on Sep. 26, 2017.

(51) Int. Cl.
*C04B 35/19* (2006.01)
*B28B 7/42* (2006.01)
(Continued)

(52) U.S. Cl.
CPC .............. *C04B 35/19* (2013.01); *B28B 1/26* (2013.01); *B28B 7/42* (2013.01); *B28B 7/46* (2013.01);
(Continued)

(58) Field of Classification Search
CPC ........... B28B 1/007; B28B 1/26; C04B 33/23; C04B 33/34; C04B 2235/6027;
(Continued)

(56) References Cited

U.S. PATENT DOCUMENTS

| 3,177,161 A | 4/1965 | Smith-Johannsen |
| 3,674,526 A | 7/1972 | Self |

(Continued)

FOREIGN PATENT DOCUMENTS

| AU | 2011224082 A1 | 10/2011 |
| CN | 1061209 A | 5/1992 |

(Continued)

OTHER PUBLICATIONS

Statham, Net-Shape Manufacture of Low-Cost Ceramic Shapes by Freeze-Gelation, Ceramic Engineering and Science Proceedings, American Ceramic Society Inc., vol. 19, No. 43; Jan. 20, 1998, pp. 553-558, XP002261632, ISSN: 0196-6219.
(Continued)

*Primary Examiner* — Erin Snelting
(74) *Attorney, Agent, or Firm* — Bose McKinney & Evans LLP

(57) ABSTRACT

The present disclosure relates to the manufacture of ceramic products by aqueous gelcasting. Exemplary ceramic products include sanitary ware, such as toilets and sinks. The process includes a slurrying step, a mixing step, a molding step involving aqueous gelcasting, a drying step, a glazing step, and a firing step.

26 Claims, 5 Drawing Sheets

(51) Int. Cl.
- *B28B 11/24* (2006.01)
- *B28B 1/26* (2006.01)
- *B28B 7/46* (2006.01)
- *C04B 33/04* (2006.01)
- *C04B 33/13* (2006.01)
- *C04B 33/28* (2006.01)
- *C04B 33/30* (2006.01)
- *C04B 33/34* (2006.01)

(52) U.S. Cl.
CPC ............ *B28B 11/243* (2013.01); *C04B 33/04* (2013.01); *C04B 33/131* (2013.01); *C04B 33/28* (2013.01); *C04B 33/30* (2013.01); *C04B 33/34* (2013.01); *C04B 2235/349* (2013.01); *C04B 2235/3418* (2013.01); *C04B 2235/3472* (2013.01); *C04B 2235/6023* (2013.01); *C04B 2235/6027* (2013.01)

(58) Field of Classification Search
CPC ............ C04B 2235/6023; C04B 35/19; C04B 2235/3201–3205; C04B 2235/3472; C04B 2235/349
See application file for complete search history.

(56) References Cited

U.S. PATENT DOCUMENTS

| | | | |
|---|---|---|---|
| 3,870,529 | A | 3/1975 | Takeomi et al. |
| 3,972,834 | A | 8/1976 | Washbourne |
| 4,183,760 | A | 1/1980 | Funk et al. |
| 4,246,209 | A | 1/1981 | Smith-Johannsen |
| 4,340,480 | A | 7/1982 | Pall et al. |
| 4,472,510 | A | 9/1984 | January |
| 4,552,800 | A | 11/1985 | Blasch et al. |
| 4,564,556 | A | 1/1986 | Lange |
| 4,574,063 | A | 3/1986 | Scherer |
| RE32,107 | E | 4/1986 | January |
| 4,614,673 | A | 9/1986 | Bendig |
| 4,772,431 | A | 9/1988 | Aubert |
| 4,918,874 | A | 4/1990 | Tiefenbach, Jr. |
| 4,975,225 | A * | 12/1990 | Vivaldi ............... C04B 35/622 264/28 |
| 5,014,763 | A * | 5/1991 | Frank ..................... B28B 1/007 164/525 |
| 5,021,369 | A | 6/1991 | Ackerman et al. |
| 5,035,725 | A | 7/1991 | Halpert et al. |
| 5,126,082 | A | 6/1992 | Frank |
| 5,364,570 | A | 11/1994 | Chadwick et al. |
| 5,514,316 | A | 5/1996 | Kosugi et al. |
| 5,610,109 | A | 3/1997 | Anderson et al. |
| 5,705,118 | A * | 1/1998 | Hayes ..................... F23D 3/08 264/43 |
| 5,716,894 | A | 2/1998 | Messer et al. |
| 5,811,171 | A | 9/1998 | Osborne et al. |
| 6,083,452 | A | 7/2000 | Kirby et al. |
| 6,284,682 | B1 | 9/2001 | Troczynski et al. |
| 6,287,994 | B1 | 9/2001 | Hart |
| 6,395,202 | B1 | 5/2002 | Nagel et al. |
| 6,787,074 | B2 | 9/2004 | Klug et al. |
| 6,846,768 | B1 | 1/2005 | Parker |
| 7,399,439 | B2 | 7/2008 | Lee et al. |
| 7,666,349 | B2 | 2/2010 | Laarz et al. |
| 8,007,696 | B2 | 8/2011 | Zambaldo |
| 8,329,090 | B2 | 12/2012 | Hollingsworth et al. |
| 8,834,752 | B2 | 9/2014 | Goetzinger et al. |
| 8,865,033 | B2 | 10/2014 | Schechner et al. |
| 8,940,223 | B2 | 1/2015 | Toncelli |
| 8,962,507 | B2 | 2/2015 | Huson et al. |
| 2003/0148291 | A1 | 8/2003 | Robotti |
| 2005/0218565 | A1 | 10/2005 | DiChiara |
| 2005/0234136 | A1 | 10/2005 | Holland et al. |
| 2008/0286590 | A1 | 11/2008 | Besida et al. |
| 2008/0314084 | A1 | 12/2008 | Connors et al. |
| 2009/0281633 | A1 * | 11/2009 | Hotta ..................... A61L 27/10 264/603 |
| 2009/0286041 | A1 | 11/2009 | Deneka et al. |
| 2010/0119500 | A1 | 5/2010 | Jokinen et al. |
| 2013/0288007 | A1 | 10/2013 | Wang et al. |
| 2014/0165875 | A1 | 6/2014 | Chaivacci et al. |
| 2020/0247718 | A1 | 8/2020 | Thomas et al. |

FOREIGN PATENT DOCUMENTS

| | | | |
|---|---|---|---|
| CN | 1225909 | A | 8/1999 |
| CN | 1522987 | A | 8/2004 |
| CN | 1686945 | A | 10/2005 |
| CN | 1793018 | A | 6/2006 |
| CN | 101293774 | A | 10/2008 |
| CN | 201357532 | Y | 12/2009 |
| CN | 101786832 | A | 7/2010 |
| CN | 103242044 | A | 8/2013 |
| CN | 103553629 | A | 2/2014 |
| CN | 104003730 | A | 8/2014 |
| CN | 105272189 | A | 1/2016 |
| CN | 106083005 | A | 11/2016 |
| CN | 106830947 | A | 6/2017 |
| CN | 107188545 | A | 9/2017 |
| DE | 102005030518 | A1 | 1/2007 |
| DE | 102011120932 | | 6/2013 |
| EP | 535854 | A1 * | 4/1993 ............ B28B 1/007 |
| EP | 1132359 | A1 | 9/2001 |
| EP | 1306148 | A1 | 5/2003 |
| GB | 0742469 | A | 12/1955 |
| KR | 20090113497 | A | 11/2009 |
| WO | 89/04735 | | 6/1989 |
| WO | 1993/009068 | | 5/1993 |
| WO | 2001/012571 | A1 | 2/2001 |

OTHER PUBLICATIONS

International Preliminary Report on Patentability for PCT/US2018/052630 dated Jan. 14, 2020, 18 pages.
International Search Report and Written Opinion for PCT/US2018/052630 dated Nov. 26, 2018, 8 pages.
Bala et al "Characterization of Beach/River sand for Foundary Application", Leonardo Journal of Sciences, Issue 23, pp. 77-83. (Year: 2013).
Definition of silicasol, no date.
International Preliminary Report on Patentability received for PCT Patent Application No. PCT/US2018/052621, dated Feb. 18, 2020, 13 pages.
International Search Report and Written Opinion received for PCT Patent Application No. PCT/US2018/052621, dated Dec. 6, 2018, 9 pages.
Kong et al., "De-stabilization mechanism and in situ solidification of alumina slurry dispersed in silica sol," Journal of Materials Processing Technology, vol. 182, (2007), pp. 489-497.
Kong et al., "Gel-casting without de-airing process using silica sol as a binder," Ceramics International, vol. 33, (2007), pp. 133-139.
Wang et al., "Gel-casting of fused silica based core packing for investment casting using silica sol as a binder," Journal of the European Ceramic Society, vol. 33, (2013), pp. 2745-2749.
Zhang Qinjuan, Ceramic Technology, Wuhan: Wuhan University of Technology Press, Mar. 1997, pp. 5, 23, 28-33, 44 and 92. (23 pages including English language translation).
Lu Xiaorong; Ceramic Technology, Changsha: Lu Xiaorong; Jan. 2005, pp. 9-13. (13 pages including English language translation).
Machine-generated English language translation of CN1793018A, retrieved on Mar. 17, 2021, 11 pgs.

* cited by examiner

AQUEOUS GELCASTING METHOD FOR CERAMIC PRODUCTS

CROSS REFERENCE TO RELATED APPLICATIONS

This application is a 371 U.S. National Phase of International Application No. PCT/US2018/052630, filed Sep. 25, 2018, which claims priority to U.S. Provisional Patent Application Ser. Nos. 62/563,345 and 62/563,350, filed Sep. 26, 2017, the disclosures of which are hereby expressly incorporated by reference herein in their entirety.

BACKGROUND AND SUMMARY OF THE DISCLOSURE

The present invention relates generally to ceramic products. More specifically, the present invention relates to ceramic products made by aqueous gelcasting.

Traditional ceramic products are made with clay as the primary ingredient. Clay is a highly variable material that is structured as a series of flat plates and contains a significant amount of chemically-bound water. Initially, the clay must be mixed with water and other ingredients to produce a moldable formulation. Later, the clay must be dried and fired to remove the added water, as well as the chemically-bound water that exists naturally in the clay. Clay's plate-like structure causes the initial water absorption and the subsequent water release to be very long, slow, and expensive processes. Clay also exhibits significant shrinkage as the added water and chemically-bound water are released. Based on all of these factors, manufacturing a traditional ceramic product can take several days or weeks, is labor intensive, is expensive, and is variable.

It is desired to provide a more efficient, cost effective, robust, and/or predictable solution for manufacturing ceramic products, especially sanitary ware.

According to an illustrative embodiment of the present disclosure, a method is provided for producing a ceramic product including introducing a mixture comprising a liquid portion into a mold having a vent, freezing the liquid portion of the mixture in a controlled direction toward the vent of the mold to form a solid ceramic article, and ejecting the solid ceramic article from the mold.

In certain embodiments, the vent is located in a second surface of the mold, and wherein the freezing step includes directing a cooling agent toward a first surface of the mold opposite the second surface of the mold such that the controlled direction of the freezing step moves from the first surface toward the second surface of the mold.

In certain embodiments, the freezing step includes directing a cryogenic cooling agent across the mold. The cryogenic cooling agent may be at least one of dry ice and liquid nitrogen.

In certain embodiments, the mold is metallic.

In certain embodiments, the freezing step occurs in 30 minutes or less.

In certain embodiments, the mixture includes colloidal silica, and wherein the freezing step includes destabilizing the colloidal silica in the mixture to solidify the mixture.

In certain embodiments, the introducing step includes injecting the mixture into the mold under a pressure of 2 psi 03.8 KPa) or less.

In certain embodiments, the method further includes thermally drying the solid ceramic article in a low humidity environment.

In certain embodiments, the solid ceramic article has a temperature gradient after the freezing step, the method further including normalizing a temperature of the solid ceramic article after the freezing step to reduce the temperature gradient, thawing the liquid portion of the solid ceramic article after the normalizing step, and evaporating the liquid portion of the solid ceramic article after the thawing step.

In certain embodiments, the solid ceramic article is white in color, and the method further includes glazing the solid ceramic article with a clear glaze formulation that lacks colorants. The method also includes firing the solid ceramic article after the glazing step.

According to another illustrative embodiment of the present disclosure, a method is provided for producing a ceramic product including freezing a liquid portion of a mixture in a mold to form a solid ceramic article, drying the solid ceramic article after the freezing step, the drying step including a normalizing stage in which the solid ceramic article is brought to a substantially uniform temperature near a thawing point of the liquid portion and a thawing stage after the normalizing stage.

In certain embodiments, at least a portion of the drying step is performed in a low humidity environment.

In certain embodiments, the freezing step involves directing a cooling agent across the mold from a first surface to a second surface of the mold, the second surface of the mold including a vent. A first portion of the solid ceramic article positioned near the first surface of the mold may be colder than a second portion of the solid ceramic article positioned near the second surface of the mold.

In certain embodiments, a temperature of the normalizing stage is about 20° F. (−6.9° C.) to about 30° F. (−1.1° C.), or about 28° F. (2.2° C.).

In certain embodiments, a duration of the normalizing stage is about 30 minutes or more.

In certain embodiments, a temperature of the thawing stage is about 40° F. (4.4° C.) or more.

In certain embodiments, the method further includes an evaporating stage after the thawing stage, wherein a temperature of the evaporating stage is about 200° F. (93.3° C.) or more.

In certain embodiments, the method further includes glazing the solid ceramic article after the drying step with a clear glaze formulation that lacks colorants and firing the solid ceramic article after the glazing step.

According to another illustrative embodiment of the present disclosure, a method is provided for producing a ceramic product including introducing a mixture comprising a liquid portion into a mold having a first surface and a second surface with a vent, freezing the liquid portion of the mixture by directing a cooling agent across the mold from the first surface to the second surface to form a solid ceramic article, normalizing the solid ceramic article to a temperature near a thawing point of the liquid portion after the freezing step, and thawing the liquid portion of the solid ceramic article after the normalizing step.

In certain embodiments, the normalizing step is performed at a temperature of about 20° F. (−6.9° C.) to about 30° F. (−1.1° C.) and the thawing step is performed at a temperature of about 40° F. (4.4° C.) or more.

In certain embodiments, the method further includes evaporating the liquid portion from the solid ceramic article after the thawing step, wherein the evaporating step is performed at a temperature of about 200° F. (93.3° C.) or more.

In certain embodiments, after the freezing step, the solid ceramic article has a temperature gradient between a first portion of the solid ceramic article positioned near the first surface of the mold and a second portion of the solid ceramic article positioned near the second surface of the mold, and after the normalizing step, the solid ceramic article has a substantially uniform temperature without the temperature gradient.

BRIEF DESCRIPTION OF DRAWINGS

A detailed description of the drawings particularly refers to the accompanying figures in which:

FIG. 3A shows introducing a mixture into a mold, FIG. 3B shows solidifying the mixture in the mold to form a solid article, FIG. 3C shows ejecting the solid article from the mold, and FIG. 3D shows the molded article.

DETAILED DESCRIPTION OF THE DRAWINGS

The embodiments of the invention described herein are not intended to be exhaustive or to limit the invention to the precise forms disclosed. Rather, the embodiments selected for description have been chosen to enable one skilled in the art to practice the invention.

The present disclosure relates to the manufacture of ceramic products by aqueous gelcasting. Exemplary ceramic products include consumer products like sanitary ware (e.g., toilets, sinks) and dinner ware. Other ceramic products may be used in electrical, automotive, aerospace, and other industries.

Figure 1:
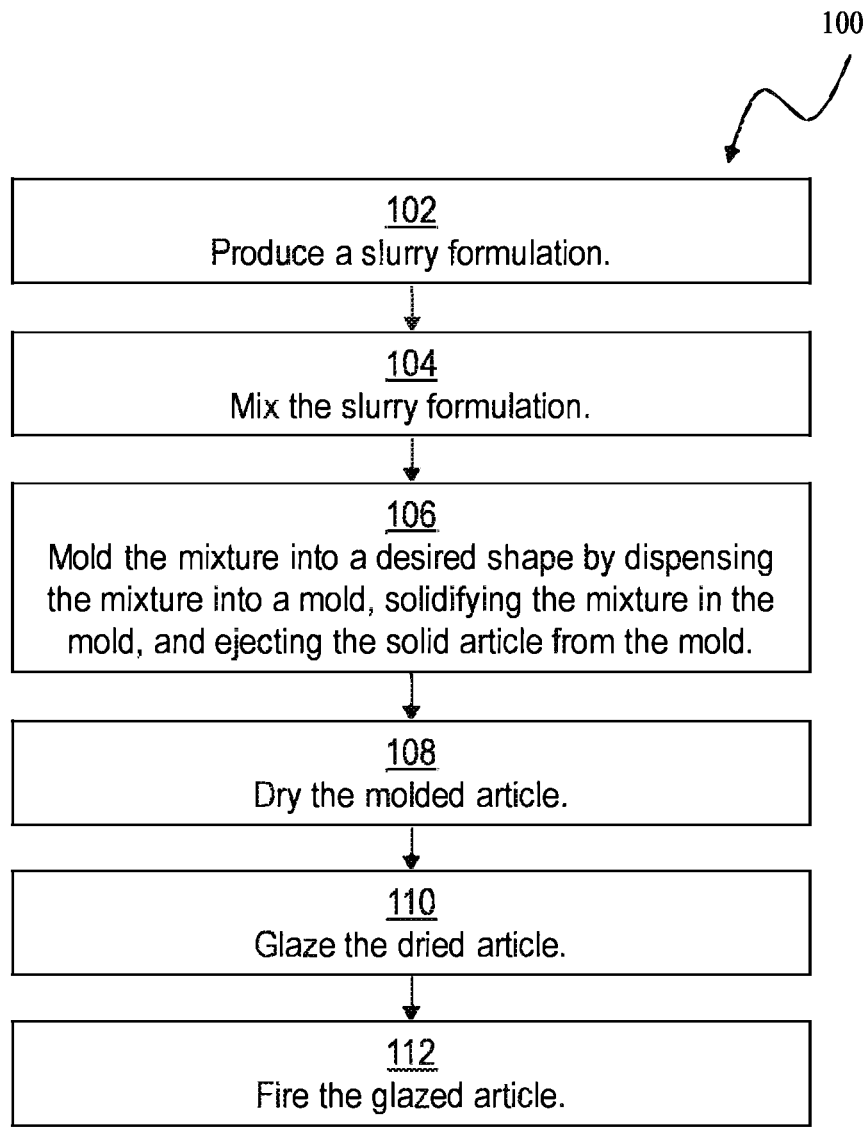
FIG. 1 is a flow chart of an exemplary method of the present disclosure including a slurrying step, a mixing step, a molding step, a drying step, a glazing step, and a firing step.

Referring initially to FIG. 1, an exemplary method 100 is disclosed for manufacturing a ceramic product. The illustrative method 100 includes a slurrying step 102, a mixing step 104, a molding step 106, a drying step 108, a glazing step 110, and a firing step 112. Each step of method 100 is described further below.

Figure 2:
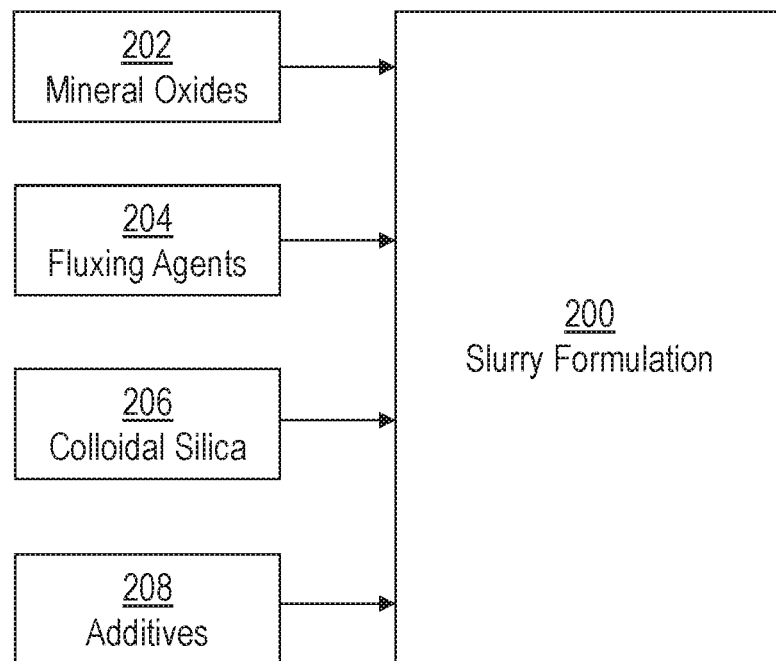
FIG. 2 is a block diagram of an exemplary slurry formulation of the present disclosure.

The slurrying step 102 of method 100 involves producing a slurry formulation. As shown in FIG. 2, an illustrative slurry formulation 200 includes one or more refined mineral oxides 202, one or more fluxing agents 204, and one or more bonding agents, such as colloidal silica 206. The slurry formulation 200 may also contain one or more optional additives 208. Each of these ingredients is described further below.

The refined mineral oxides 202 in the slurry formulation 200 are used to produce a crystalline or non-crystalline (e.g., glass) network structure in the resulting ceramic product having a desired stiffness and porosity. With respect to porosity, for example, the ceramic product may exhibit less than 0.5% water absorption to qualify as a vitreous product according to ASME A112.19.2 or less than 15% water absorption to qualify as a non-vitreous product according to ASME A112.19.2, but other water absorption levels are also contemplated. Exemplary mineral oxides 202 for use in the slurry formulation 200 include silica ($SiO_2$), which is relatively inexpensive, and/or alumina ($Al_2O_3$), which is relatively expensive but enhances durability of the resulting product. The mineral oxides 202 may be provided in granular or powder form to facilitate mixing, such as fumed silica. The concentration of mineral oxides 202 in the slurry formulation 200 may be as low as about 10 wt. %, about 20 wt. %, about 30 wt. %, or about 40 wt. %, and as high as about 50 wt. %, about 60 wt. %, about 70 wt. %, about 80 wt. %, or about 88 wt. %. For example, in certain embodiments, the concentration of mineral oxides 202 in the slurry formulation 200 may be between about 25 wt. % and about 45 wt. %. Lower concentrations of mineral oxides 202 may lead to lower strength products, lower stiffness resulting in more deflection, lower bulk density, higher porosity, longer processing times for removing water, higher potential shrinkage during processing, and lower material costs, while higher concentrations of mineral oxides 202 may lead to higher strength products, higher bulk density, lower porosity, shorter processing times for removing water, lower potential shrinkage during processing, and higher material costs.

The fluxing agents 204 are used to decrease the melting point of the resulting slurry formulation 200, specifically the network-forming silica in the slurry formulation 200. Exemplary fluxing agents 204 include oxides of potassium (K), sodium (Na), and calcium (Ca). The fluxing agents 204 may be provided in granular or powder form to facilitate mixing.

Rather than using pure forms of potassium oxide ($K_2O$), sodium oxide ($Na_2O$), and calcium oxide (CaO), for example, the fluxing agents 204 of the present disclosure may be sourced from one or more refined alkali aluminosilicate minerals of Formula I below:

$$M_w Al_x Si_y O_z \qquad (I)$$

wherein:
M is an alkali metal (e.g., K, Na) or an alkaline earth metal (e.g., Ca).

Exemplary alkali aluminosilicate minerals include Feldspar ($KAlSi_3O_8$—$NaAlSi_3O_8$—$CaAl_2Si_2O_8$) and Nepheline Syenite ($(Na,K)AlSiO_4$), for example. Advantageously, such alkali aluminosilicate minerals are more readily available and less expensive than pure fluxing oxides. Also, in addition to providing the desired fluxing oxides, the alkali aluminosilicate minerals may also contribute additional quantities of the elements found in the above-described mineral oxides 202 (e.g., silicon, aluminum). The concentration of alkali aluminosilicate minerals as fluxing agents 204 in the slurry formulation 200 may be as low as about 10 wt. %, about 20 wt. %, about 30 wt. %, or about 40 wt. %, and as high as about 50 wt. %, about 60 wt. %, about 70 wt. %, about 80 wt. %, or about 85 wt. %. For example, in certain embodiments, the concentration of alkali aluminosilicate minerals in the slurry formulation 200 may be about 50 wt. % to about 70 wt. %, which constitutes a majority of the slurry formulation 200 and makes the fluxing agents 204 the primary ingredient (i.e., the ingredient present in the largest amount) in the slurry formulation 200. Lower concentrations of fluxing agents 204 may lead to higher material costs and higher firing temperatures in the subsequent firing step 112 (FIG. 1), while higher concentrations of fluxing agents 204 may lead to lower material costs and lower firing temperatures in the subsequent firing step 112 (FIG. 1).

The colloidal silica (i.e., sol-gel synthesized silica) 206 in the slurry formulation 200 comprises nanoparticles of silica ($SiO_2$) suspended in water. The solid content of the colloidal silica 206 may vary. For example, the solid content of the colloidal silica 206 may be about 10 wt. %, about 20 wt. %, about 30 wt. %, about 40 wt. %, or about 50 wt. %, with water making up the balance. The colloidal silica 206 may serve as a bonding agent throughout method 100 (FIG. 1).

During both the initial forming step 102 and the mixing step 104 (FIG. 1), which is described further below, the colloidal silica 206 may be used to hold the other granular ingredients in suspension. During the subsequent molding step 106 (FIG. 1), which is also described further below, the colloidal silica 206 may be used to bind the other ingredients together by forming a gel network or scaffold that remains even after the water is removed. The colloidal silica 206 is typically a basic solution (i.e., pH>7), but neutral solutions (pH=7) and acidic solutions (i.e., pH<7) are also available. The concentration of colloidal silica 206 in the slurry formulation 200 may be as low as about 2 wt. %, about 5 wt. %, about 10 wt. %, about 15 wt. %, or about 20 wt. %, and as high as about 25 wt. %, about 30 wt. %, about 35 wt. %, or about 40 wt. %, for example. Lower concentrations of colloidal silica 206 may lead to lower material costs and lower green strength before the firing step 112 (FIG. 1), while higher concentrations of colloidal silica 206 may lead to higher material costs and higher green strength before the firing step 112 (FIG. 1).

One optional additive 208 for use in the slurry formulation 200 includes clay or clay minerals (e.g., kaolinite, bentonite). Rather than relying on clay as a primary ingredient and bonding agent like traditional ceramic products, small amounts of clay or clay minerals may be used as a suspension agent in the slurry formulation 200. The concentration of clay or clay mineral additives 208 in the slurry formulation 200 may be as low as about 0 wt. %, about 2 wt. %, or about 4 wt. %, and as high as about 6 wt. %, about 8 wt. %, or about 10 wt. %, for example. Compared to traditional ceramic products, the slurry formulation 200 of the present disclosure may be considered entirely or substantially clay-free.

Other optional additives 208 include mixing agents, suspension agents, and/or dispensing agents. One such additive 208 is organic gum, such as carboxymethyl cellulose (CMC) gum, xanthan gum, guar gum, acacia gum, or methylcellulose. The concentration of organic gum additives 208 in the slurry formulation 200 may be about 0 wt. %, about 1 wt. %, or about 2 wt. %, for example.

Still other optional additives 208 include organic defoamers and surfactants such as polyvinyl alcohol or polyvinyl pyrrolidone. Such additives 208 may promote bubble formation to remove air from the slurry formulation 200.

Still other optional additives 208 include dispersants, including anionic dispersants such as polyacryline acid, cationic dispersants such as poly(ethyleneimine), and/or comb polymers such as poly(ethylene oxide)-poly(ethyleneimine).

The solid particles in the slurry formulation 200 may include the mineral oxides 202, the fluxing agents 204, the silica from the colloidal silica 206, and any solid additives 208. The liquid in the slurry formulation 200 may include added water and/or the water from the colloidal silica 206 and any other liquid-containing ingredients. The solid content of the slurry formulation 200 may be about 70 wt. %, about 80 wt. %, about 90 wt. %, or more. The solid content of the slurry formulation 200 may be optimized between a maximum solid content, in which the corresponding liquid content would be too low and the slurry formulation 200 would be too thick for injection into a mold during the subsequent molding step 108, and a minimum solid content, in which the corresponding liquid content would be too high and cause undesirable shrinkage and/or deformation when the liquid is removed during the subsequent drying step 108 and firing step 112.

Exemplary slurry formulations 200 are set forth in Table 1 below, but these slurry formulations 200 may vary based on the trends described above to achieve a final ceramic product having desired properties.

TABLE 1

| Slurry Ingredients | | Concentration Range (wt. %) | Sample Concentration A (wt. %) | Sample Concentration B (wt. %) |
|---|---|---|---|---|
| Mineral oxides 202 | Silica | Balance | 17.8 | 12.9 |
| | Alumina | 10-70 | 17.4 | 17.4 |
| Fluxing agent 204 | Alkali aluminosilicate minerals (e.g., Feldspar) | 10-85 | 56.0 | 56.0 |
| Colloidal silica 206 | | 2-40 | 8.8 (30 wt. % $SiO_2$/ 70 wt. % water) | 13.7 (40 wt. % $SiO_2$/ 60 wt. % water) |
| Additives 208 | | 0-12 | — | — |
| Total | | 100 | 100.0 | 100.0 |

The solid ingredients in Table 1 above may include: the silica ($SiO_2$) and alumina ($Al_2O_3$) mineral oxides 202, the Feldspar ($KAlSi_3O_8$—$NaAlSi_3O_8$—$CaAl_2Si_2O_8$) fluxing agent 204, and the additional silica ($SiO_2$) from the colloidal silica 206. The composition of these solid ingredients, taken together, is set forth in Table 2 below. In certain embodiments of slurry formulation 200, the mineral oxides (e.g., silica and alumina) are the majority solid components, and the fluxing oxides (e.g., sodium oxide, potassium oxide, and calcium oxide) are the minority solid components. In the "Sample Concentration" embodiment of Table 2, in particular, silica is the primary solid component, alumina is the secondary solid component, and the fluxing oxides are the tertiary solid component.

TABLE 2

| Composition | Concentration Range (wt. %) | Sample Concentration (wt. %) |
|---|---|---|
| Silica | Balance | 65.0 |
| Alumina | 15-75 | 27.8 |
| Sodium Oxide | 1-9 | 3.6 |
| Potassium Oxide | 1-5 | 2.3 |
| Calcium Oxide | 0.25-2 | 0.8 |
| Total | 100 | 100.0 |

Slurry formulation 200 may consist of or consist essentially of the ingredients listed in Table 1 and Table 2 above and may lack certain ingredients found in other ceramic materials. For example, slurry formulation 200 may lack lithium oxide, barium oxide, zirconium oxide, cerium oxide or cerium fluoride, iron oxide, and/or magnesium oxide.

Returning to FIG. 1, the slurry formulation from step 102 is mixed during the mixing step 104 of method 100. With respect to the slurry formulation 200 of FIG. 2, for example, the mixing step 104 may involve evenly distributing the solid particles in the slurry formulation 200—namely the mineral oxides 202, the fluxing agents 204, the silica from the colloidal silica 206, and any solid additives 208—throughout the liquid in the slurry formulation 200—namely, any added water and/or the water from the colloidal silica 206 and any other liquid-containing ingredients. Care should be taken to minimize air entrainment in the slurry formulation 200 during the mixing step 104. A double planetary, low shear mixer has been shown to minimize such air entrainment. The mixing step 104 may be terminated when adequate mixing is achieved, which may be measured using a Hegman gauge, for example. A well-dispersed and deagglomerated mixture typically has a value of 6 or better using a Hegman gauge. The mixing step 104 of the present disclosure may be terminated after less than an hour and in some cases after several minutes. Traditional clay ceramics, by contrast, are usually mixed for several days.

Next, the mixture from step 104 is molded into a desired shape during the molding step 106 of method 100. The molding step 106 may involve: introducing the mixture 300 into a mold 310, as shown in FIG. 3A; solidifying the mixture 300 in the mold 310 to form a solid article 320, as shown in FIG. 3B; and ejecting the solid article 320 from the mold 310, as shown in FIG. 3C, to form a molded article 325, as shown in FIG. 3D.

Figure 3A:
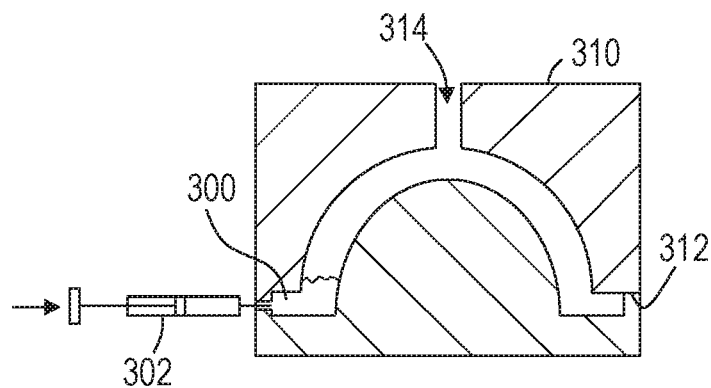
FIGS. 3A-3D are schematic views of the molding step of the present disclosure, where

As shown in FIG. 3A, the introducing process may involve injecting the mixture 300 into the mold 310 under pressure (e.g., 1-2 psi), such as using a manual or hydraulic piston 302. Other methods for introducing the mixture 300 into the mold 310 may also be used, such as pouring the mixture 300 into the mold 310. Because the mixture 300 may have a low viscosity and may be capable of flowing easily into the mold 310, any seams 312 in the mold 310 should be adequately sealed to prevent leakage. Care should be taken to minimize air entrapment in the mold 310, especially in any blind pockets of the mold 310. One or more air vents 314 may be provided in the mold 310 to allow air to escape from the mold 310.

Figure 3B:
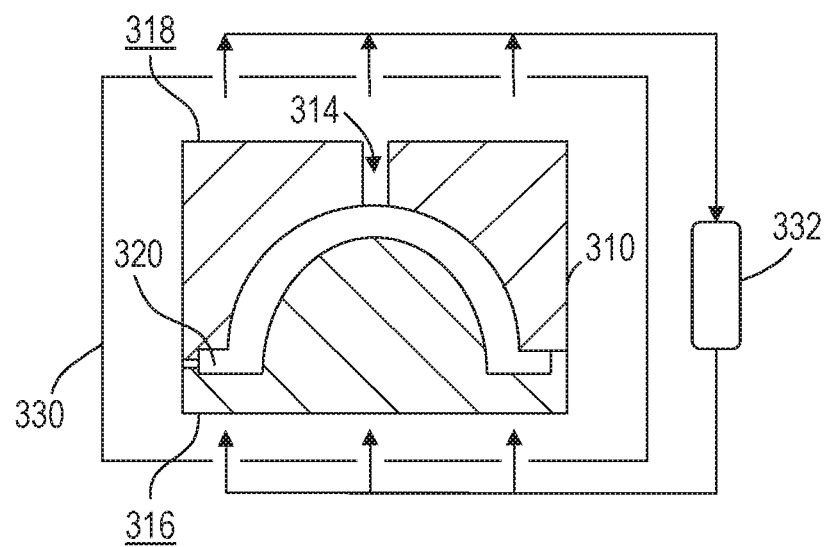
Figure 3C:
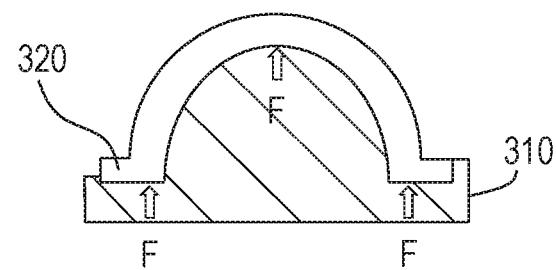
Figure 3D:
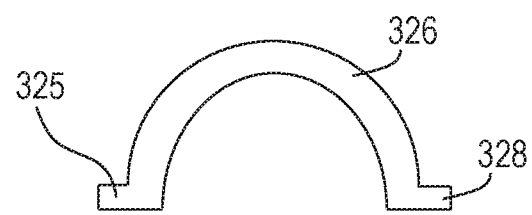

As shown next in FIG. 3B, the solidifying process may involve destabilizing the colloidal silica in the mixture 300 to form a gel network or scaffold of siloxane bonds that maintain the shape of the solid article 320. Thus, the solidifying process may also be referred to herein as a gelcasting or gelling process.

An exemplary method for destabilizing the colloidal silica is freeze gelling. Freeze gelling involves freezing the water in the mixture 300 and forming ice crystals, which may expand and physically force the silica particles together to form the gel network. Advantageously, the freezing may occur directly in the mold 310 by placing the entire mold 310 in a freezer 330, which is considered a vessel configured to expose its contents, directly and/or indirectly, to a low-temperature cooling agent 332 capable of freezing the contents. In certain embodiments, the cooling agent 332 is directed across the mold 310, as shown in FIG. 3B. In a traditional freezer 330, for example, the cooling agent 332 may include low-temperature air that is blown across a refrigerant (e.g., norflurane, freon) in an evaporator coil. However, as discussed further below, other freezer 330 arrangements and low-temperature or cryogenic cooling agents 332 are also contemplated, such as dry ice or liquid nitrogen.

According to an exemplary embodiment of the present disclosure, the freezing process occurs at a fast rate, especially as the geometric complexity of the mold 310 increases. When the freezing occurs at a fast rate, the resulting ice crystals will be smaller and more homogeneous, and the resulting gel network will also be more homogeneous. If the freezing occurred at a slow rate, by contrast, the resulting ice crystals would be larger (e.g., snowflake type structures), and the resulting gel network may be variegated with large grain boundaries and cracks. The freezing rate may be increased by subjecting the mold 310 to very low temperatures in the freezer 330. For example, the freezing rate may be increased by introducing a cryogenic cooling agent 332, such as dry ice or liquid nitrogen, across the mold 310 in the freezer 330, as shown in FIG. 3B. The freezing rate may also be increased by increasing the thermal conductivity of the mold 310, such as by constructing the mold 310 with thin and/or highly thermally conductive walls, such as metallic (e.g., aluminum, copper alloy) walls, rather than thick and/or thermally insulating walls, such as plastic walls. In certain embodiments, the freezing process is performed in 30 minutes, 20 minutes, 10 minutes, 5 minutes, or less According to another exemplary embodiment of the present disclosure, the freezing process occurs in a predetermined direction toward the air vent 314 in the mold 310. This controlled freezing direction may be achieved by directing the cooling agent 332 toward a surface of the mold 310 that opposes the air vent 314 in the mold 310. In the illustrated embodiment of FIG. 3B, for example, the cooling agent 332 is directed toward a lower surface 316 of the mold 310 opposing the air vent 314, across the mold 318, and toward the upper surface 318 of the mold 310 including the air vent 314 such that the article 320 freezes in a predetermined direction from the lower surface 316 toward the air vent 314 in the upper surface 318. Because the water in the article 320 expands in volume as it freezes, air and any excess mixture 300 in the mold 310 may be displaced toward the air vent 314 and allowed to escape through the air vent 314 during the freezing process. Allowing such materials to escape from the mold 310 rather than being trapped in the mold 310 may minimize internal stresses in the article 320, thereby minimizing stress cracks in the article 320. Also, allowing such materials to escape from the mold 310 may provide a visual indication that the freezing process is completed. The cooling agent 332 may be exhausted from the freezer 330 or recirculated through the freezer 330, as shown in FIG. 3B.

Another available method for destabilizing the colloidal silica is chemical gelling. Chemical gelling involves adding a gelling agent to the mixture 300 to change the pH and reduce surface charges of the mixture 300 in a manner that discourages chemical repulsion of the silica particles and encourages gelling of the silica particles. Suitable gelling agents include hydrochloric acid (HCl), citric acid ($C_6H_8O_7$), magnesium carbonate ($MgCO_3$), and sodium chloride (NaCl) salts, for example. Care should be taken to adequately blend the gelling agent into the mixture 300 without breaking the gel network as it forms.

Yet another available method for destabilizing the colloidal silica is drying. Drying involves heating the mixture 300 and evaporating the water from the mixture 300 to physically force the remaining silica particles together to form the gel network. Advantageously, the drying may occur directly in the mold 310 by placing the entire mold 310 in a heater (not shown). The mold 310 may require several openings to allow the evaporating water to escape.

Still other available methods for destabilizing the colloidal silica include: traditional gelcasting by adding a monomer and an initiator into the mixture 300 and heating the mixture 300 to polymerize and cross-link the gel network; chemical gelcasting by adding ionic polymers or particles to bridge the charged silica particles into the gel network; and slip-casting by removing water from the mixture 300, such as using a plaster mold, to form the gel network.

As shown next in FIG. 3C, the solid article 320 is ejected from the mold 310. If the solid article 320 was formed by freeze gelling, the solid article 320 may remain frozen during the ejection process. The ejection process may involve opening the mold 310 and applying an ejection force F to push the solid article 320 out of the mold 310. The ejection force F may be achieved by directing ejector pins and/or compressed air against the solid article 320, for example.

As shown next in FIG. 3D, the solid article 320 is removed from the mold 310 as a molded article 325. The illustrative molded article 325 is in the shape of a sink basin having a bowl 326 and a rim 328, but it is understood that the molded article 325 may have any desired shape or purpose, such a toilet, another sanitary ware product, a dinner ware product, or any other product. The molded article 325 may be coupled to one or more other solid articles to form a larger and/or more complex product. The mixture 300 that was used to form the molded article 325 may also be used as an adhesive to couple the various solid articles together. The smooth finish of the mold 310 (FIG. 3B) may produce a similarly smooth molded article 325, so the molded article 325 may require minimal secondary finishing after being removed from the mold 310. In certain embodiments, the secondary finishing may be limited to parting lines on the molded article 325 imparted by the seams 312 of the mold 310 (FIG. 3A).

Figure 4:
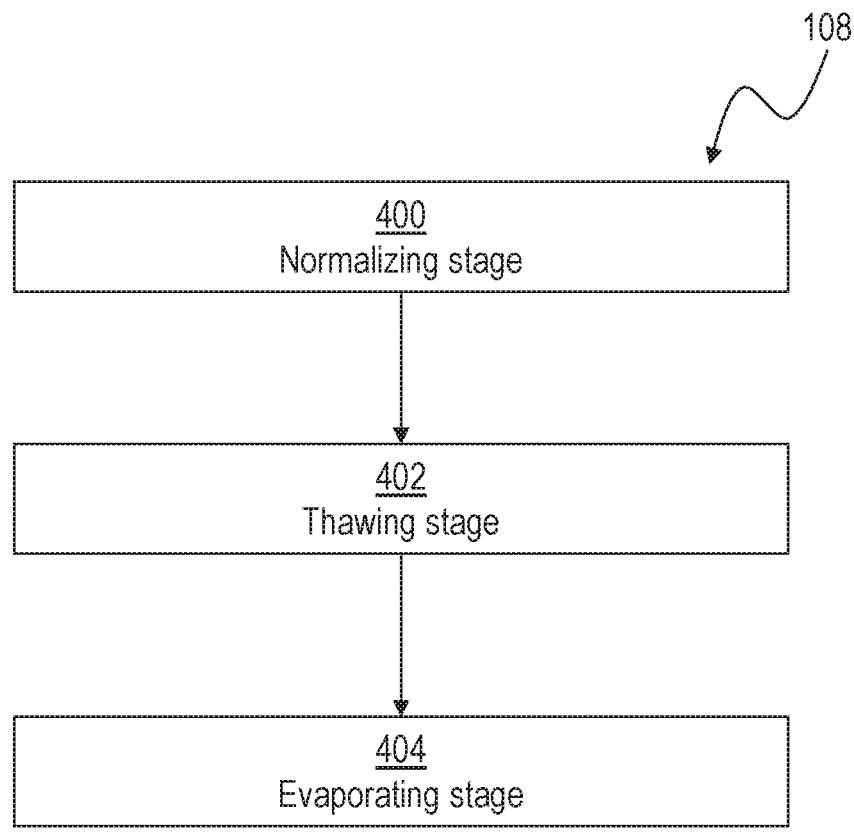
FIG. 4 is a flow chart of an exemplary drying step of the present disclosure.

Referring to FIGS. 1 and 4, the molded article 325 from the molding step 106 is dried during the drying step 108 of method 100 to remove water from the molded article 325. It is within the scope of the present disclosure for the drying step 108 to at least partially overlap the molding step 106. For example, the drying step 108 may be at least partially performed with the solid article 320 remaining inside the mold 310 (FIG. 3B). The drying step 108 should be controlled to minimize shrinking and cracking as the water is removed from the molded article 325. If the molded article 325 from the molding step 106 was formed by freeze gelling, the drying step 108 may be a multi-stage process as shown in FIG. 4, which illustratively includes a pre-thawing normalizing stage 400, a thawing stage 402, and an evaporating stage 404. Each stage 400, 402, 404 of the drying step 108 is described further below.

The pre-thawing normalizing stage 400 of the drying step 108 involves placing the still-frozen molded article 325 in a temperature-controlled, optionally high-airflow environment to bring the molded article 325 to a substantially uniform frozen state having a substantially uniform temperature near a thawing/freezing point of water (e.g., near about 32° F. (0° C.)). The molded article 325 may enter the normalizing stage 400 in a non-uniform frozen state having a non-uniform temperature. In one embodiment, the molded article 325 enters the normalizing stage 400 from the freezing process of FIG. 3B with a temperature gradient caused by the directional nature of the freezing process. For example, the area of the molded article 325 that was positioned close to the cooling agent 332 in FIG. 3B (e.g., the rim 328 of FIG. 3D) may be colder than the area of the molded article 325 that was positioned away from the cooling agent 332 and close to the vent 314 in FIG. 3B (e.g., the bowl 326 of FIG. 3D). In another embodiment, thinner areas of the molded article 325 may be colder than thicker areas of the molded article 325, regardless of whether the freezing process was directional in nature. The temperature of the normalizing stage 400 may be just below the thawing/freezing point of water, such as about 20° F. (−6.9° C.) to about 30° F. (−1.1° C.), more specifically about 25° F. (−3.9° C.) to about 30° F. (−1.1° C.), more specifically about 28° F. (−2.2° C.). The duration of the normalizing stage 400 may be sufficient to minimize any temperature differences and achieve the substantially uniform temperature throughout the molded article 325, such as about 15 minutes to about 60 minutes, more specifically about 30 minutes. Of course, the temperature and duration of the normalizing stage 400 may vary based on the size and shape of the molded article 325, the design of the mold 310, and the freezing process conditions. It is also within the scope of the present disclosure to eliminate the normalizing stage 400 altogether if the molded article 325 already has a sufficiently uniform temperature.

The thawing stage 402 of the drying step 108 involves heating the molded article 325 in a temperature-controlled, optionally high-airflow environment from a substantially uniform frozen state near the thawing point to a thawed state. The temperature of the thawing stage 402 may be above the thawing/freezing point of water, such as about 40° F. (4.4° C.), about 50° F. (10° C.), about 60° F. (15.6° C.), about 70° F. (21.1° C.), or more. During the thawing stage 402, the water in the molded article 325 decreases in volume. Without the prior normalizing stage 400, the molded article 325 could transition from the freezing process to the thawing stage 402 in a non-uniform manner (e.g., with a temperature gradient caused by directional freezing, with different temperatures in areas of different thickness, with different temperatures caused by inconsistent warming after freezing), causing the thawing process and its related dimensional changes to occur inconsistently. Such inconsistent thawing could create internal stresses in the molded article 325, which lead to stress cracks in the molded article 325. However, by subjecting the molded article 325 to the prior normalizing stage 400, the molded article 325 enters the thawing stage 402 with a substantially uniform temperature already near the thawing point of water, allowing the thawing process and its related dimensional changes to occur quickly and uniformly. In one example, the molded article 325 is thawed quickly and uniformly in the thawing stage 402 from the normalized temperature of about 28° F. to the thawing point of about 32° F. (0° C.). Such uniform thawing minimizes internal stresses in the molded article 325 and reduces the formation of stress cracks in the molded article 325.

The evaporating stage 404 of the drying step 108 involves further heating the molded article 325 in a temperature-controlled, optionally high-airflow environment from the thawed state to a heated state sufficient to evaporate water. Water may be more easily and evenly liberated from the gel-based articles of the present disclosure than from traditional ceramic articles. Therefore, the evaporating stage 404 of the drying step 108 may be performed at higher temperatures and higher speeds than traditional drying processes, including temperatures above the boiling point of water. For example, the evaporating stage 404 of the drying step 108 may be performed at temperatures of about 200° F. (93.3°

C.) to about 500° F. (260° C.), whereas traditional drying processes are typically performed at temperatures below 150° F.). (65.6°. It is also within the scope of the present disclosure to perform the evaporating stage 404 over an extended period of time and at a lower temperature (e.g., less than about 200° F. 03.3° C.), less than about 150° F. (65.6° C.), less than about 100° F.(?), or about 70° F. (21.1° C.)).

According to an exemplary embodiment of the present disclosure, the normalizing stage 400, the thawing stage 402, and/or the evaporating stage 404 of the drying step 108 may be performed in a controlled, low-humidity environment. In one embodiment, at least the thawing stage 402, if applicable, is performed in the low-humidity environment. The low-humidity environment may be a vacuum having 0% humidity.

The dried product from the drying step 108 may be very strong. In certain embodiments, the dried product may be capable of withstanding machining and robust handling, even before the final firing step 112.

In step 110 of method 100, the dried product from step 108 is glazed. The glazing step 110 of the present disclosure may be similar to a traditional glazing process. The glaze formulation may include one or more glass-formers such as silica, one or more fluxing agents, and one or more optional additives. Advantageously, the dried product from step 108 may be an attractive white color, so the need for adding colorants to an otherwise clear glaze formulation may be reduced or eliminated. In certain embodiments, the glaze formulation may be applied to the dried product in aqueous form, such as by dipping the product into the glaze, brushing the glaze onto the product, spraying the glaze onto the product, or pouring the glaze onto the product. In other embodiments, the glaze formulation may be applied to the dried product in dry or powder form.

In step 112 of method 100, the glazed product from step 110 is fired. The firing step 112 of the present disclosure may be similar to a traditional firing process. However, the firing step 112 of the present disclosure may be performed at a faster rate than a traditional firing process and with less regard to outgassing, because the ceramic products of the present disclosure lack significant amounts of chemically-bound water and organics that are associated with traditional clay ceramic products. The firing step 112 may convert the applied glaze to an impervious, vitreous coating that is fused to the underlying ceramic product, similar to traditional Vitreous china (VC) products.

The final ceramic product may have substantially the same composition as the initial slurry formulation 200, except the final ceramic product lacks the water present in the initial slurry formulation 200. For example, the composition of the final ceramic product may be set forth in Table 1 (not including water) or Table 2 above. In certain embodiments of the final ceramic product, the mineral oxides (e.g., silica and alumina) are majority components, and the fluxing oxides (e.g., sodium oxide, potassium oxide, and calcium oxide) are minority solid components.

Although the invention has been described in detail with reference to certain preferred embodiments, variations and modifications exist within the spirt and scope of the invention as described and defined in the following claims.

The invention claimed is:

1. A method of producing a ceramic product comprising:
introducing a slurry into a mold, the slurry comprising:
at least one mineral oxide constituting about 10 wt. % to about 88 wt. % of the slurry;
at least one alkali aluminosilicate mineral separate from the at least one mineral oxide and configured to serve as a fluxing agent to reduce the melting point of the slurry;
a colloidal silica; and
a portion of water sufficient to render the slurry capable of flowing into the mold;
the mold having an interior, an injection port in communication with the interior of the mold, and an air vent distinct from the injection port and in communication with the interior of the mold;
freezing the liquid portion of the mixture slurry in a controlled direction toward the vent of the mold to form a solid ceramic article; and
ejecting the solid ceramic article from the mold.

2. The method of claim 1, wherein the air vent is located in a second surface of the mold, and wherein the freezing step comprises directing a cooling agent toward a first surface of the mold opposite the second surface of the mold such that the controlled direction of the freezing step moves from the first surface toward the second surface of the mold.

3. The method of claim 1, wherein the freezing step comprises directing a cryogenic cooling agent across the mold.

4. The method of claim 3, wherein the cryogenic cooling agent is at least one of dry ice and liquid nitrogen.

5. The method of claim 1, wherein the mold is metallic.

6. The method of claim 1, wherein the freezing step occurs in 30 minutes or less.

7. The method of claim 1, wherein the slurry includes colloidal silica, and wherein the freezing step comprises destabilizing the colloidal silica in the slurry to solidify the slurry.

8. The method of claim 1, wherein the introducing step comprises injecting the slurry into the mold under a pressure of 2 psi or less.

9. The method of claim 1, further comprising thermally drying the solid ceramic article.

10. The method of claim 1, wherein the solid ceramic article has a temperature gradient after the freezing step, the method further comprising:
normalizing a temperature of the solid ceramic article after the freezing step to reduce the temperature gradient;
thawing the liquid portion of the solid ceramic article after the normalizing step; and
evaporating the liquid portion of the solid ceramic article after the thawing step.

11. The method of claim 1, wherein the solid ceramic article is white in color, the method further comprising glazing the solid ceramic article with a clear glaze formulation that lacks colorants.

12. The method of claim 11, further comprising firing the solid ceramic article after the glazing step.

13. A method of producing a ceramic product comprising:
freezing a liquid portion of a slurry in a mold to form a solid ceramic article, the slurry comprising:
at least one mineral oxide constituting about 10 wt. % to about 88 wt. % of the slurry;
at least one alkali aluminosilicate mineral separate from the at least one mineral oxide and configured to serve as a fluxing agent to reduce the melting point of the slurry;
a colloidal silica; and
a portion of water sufficient to render the slurry capable of flowing into the mold;

drying the solid ceramic article after the freezing step, the drying step comprising:
- a normalizing stage in which the solid ceramic article is brought to a substantially uniform temperature near a thawing point of the liquid portion; and
- a thawing stage after the normalizing stage.

14. The method of claim 13, wherein at least a portion of the drying step is performed in a heated environment sufficient to evaporate water.

15. The method of claim 13, wherein the freezing step involves directing a cooling agent across the mold from a first surface to a second surface of the mold, the second surface of the mold including a vent.

16. The method of claim 15, wherein a first portion of the solid ceramic article positioned near the first surface of the mold is colder than a second portion of the solid ceramic article positioned near the second surface of the mold.

17. The method of claim 13, wherein a temperature of the normalizing stage is about 20° F. (−6.9° C.) to about 30° F. (−1.1° C.).

18. The method of claim 17, wherein the temperature of the normalizing stage is about 28° F. (2.2° C.).

19. The method of claim 13, wherein a duration of the normalizing stage is about 30 minutes or more.

20. The method of claim 13, wherein a temperature of the thawing stage is about 40° F. (4.4° C.) or more.

21. The method of claim 13, further comprising an evaporating stage after the thawing stage, wherein a temperature of the evaporating stage is about 200° F. (93.3° C.) or more.

22. The method of claim 13, further comprising:
- glazing the solid ceramic article after the drying step with a clear glaze formulation that lacks colorants; and
- firing the solid ceramic article after the glazing step.

23. A method of producing a ceramic product comprising:
- introducing a slurry comprising a liquid portion into a mold having an interior, a first surface and a second surface with an inlet in communication with the interior of the mold and an air vent in communication with the interior of the mold, wherein the inlet and the air vent are distinct from one another;
- freezing the liquid portion of the slurry by directing a cooling agent across the mold from the first surface to the second surface to form a solid ceramic article;
- normalizing the solid ceramic article to a temperature near a thawing point of the liquid portion after the freezing step; and
- thawing the liquid portion of the solid ceramic article after the normalizing step;
- wherein the slurry comprises:
  - at least one mineral oxide constituting about 10 wt. % to about 88 wt. % of the slurry;
  - at least one alkali aluminosilicate mineral separate from the at least one mineral oxide and configured to serve as a fluxing agent to reduce the melting point of the slurry;
  - a colloidal silica; and a portion of water sufficient to render the slurry capable of flowing into the mold.

24. The method of claim 23, wherein:
- the normalizing step is performed at a temperature of about 20° F. (−6.9° C.) to about 30° F. (−1.1° C.); and
- the thawing step is performed at a temperature of about 40° F. (4.4° C.) or more.

25. The method of claim 23, further comprising evaporating the liquid portion from the solid ceramic article after the thawing step, wherein the evaporating step is performed at a temperature of about 200° F. (93.3° C.) or more.

26. The method of claim 23, wherein:
- after the freezing step, the solid ceramic article has a temperature gradient between a first portion of the solid ceramic article positioned near the first surface of the mold and a second portion of the solid ceramic article positioned near the second surface of the mold; and
- after the normalizing step, the solid ceramic article has a substantially uniform temperature without the temperature gradient.

\* \* \* \* \*